April 21, 1936.  J. R. HEIDLOFF  2,038,217
HOSE COUPLING
Original Filed May 4, 1929
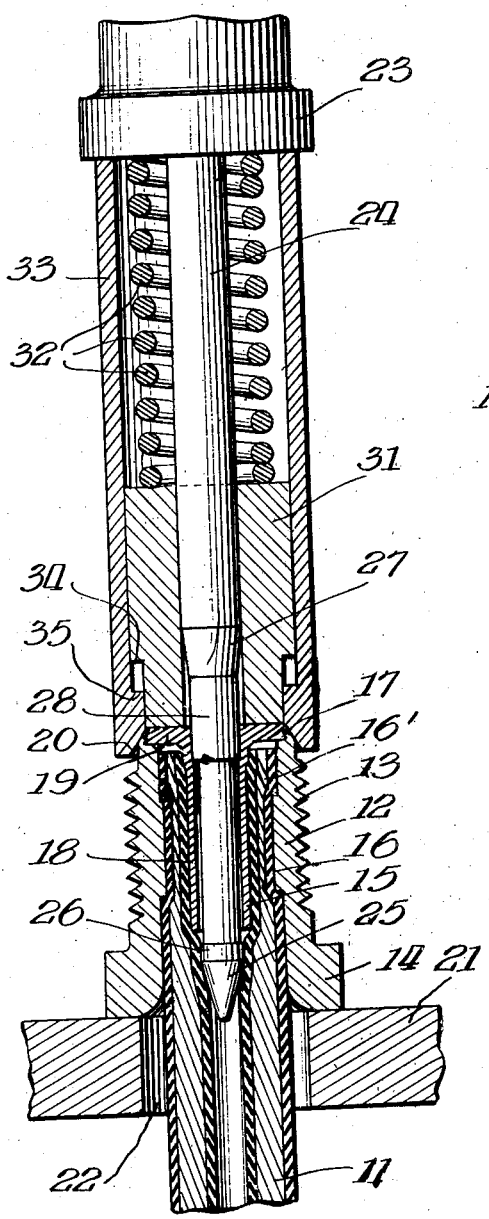
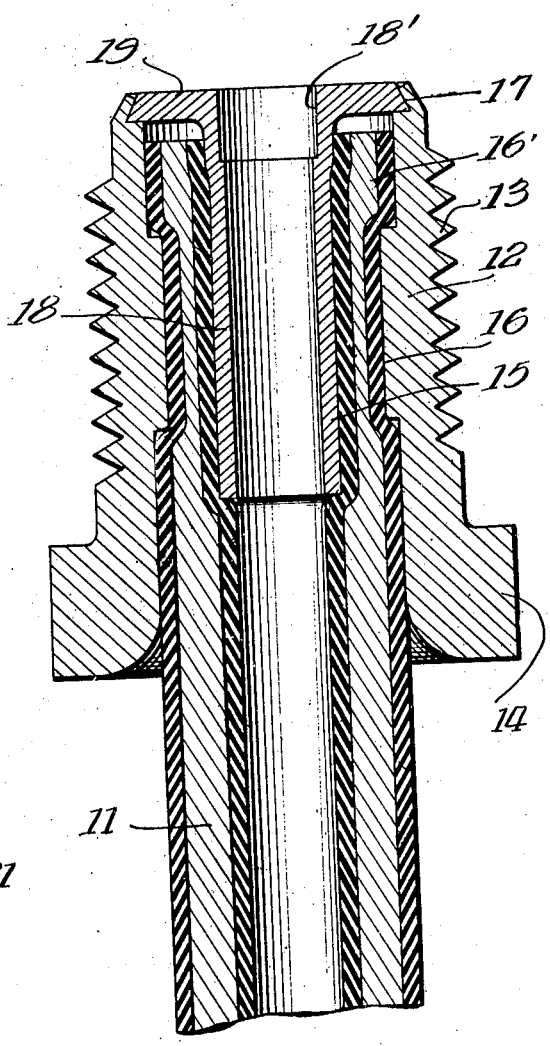
Inventor:
Joseph R. Heidloff
By Williams, Bradbury,
McCaleb & Hinkle Attys.

Patented Apr. 21, 1936

2,038,217

UNITED STATES PATENT OFFICE 2,038,217

HOSE COUPLING

Joseph R. Heidloff, South Bend, Ind., assignor to Hydraulic Brake Company, Detroit, Mich., a corporation of California Original application May 4, 1929, Serial No. 360,360, now Patent No. 1,886,807, dated November 8, 1932. Divided and this application June 27, 1932, Serial No. 619,368

1 Claim. (Cl. 285—84)

My invention relates to hose couplings particularly adapted for high pressure hose.

The couplings for high pressure hose, such as used in hydraulic brake systems, must be firmly and securely attached to the hose in order to prevent the high pressure in the hose from separating the coupling and the hose. Such hose is further subjected to whipping action resulting from relative movement between the vehicle frame and the wheels.

An object of my invention is to provide a novel coupling which is especially designed to meet these conditions of service.

Referring to the drawing, Fig. 1 is a sectional view of my new and improved thimble and assembly apparatus therefor; and Fig. 2 is an enlarged sectional view of the thimble shown in Fig. 1.

In the drawing I have shown my new and improved thimble as applied to a hose 11 which is of the high pressure type, such as used in hydraulic braking systems. A sleeve 12 is placed over one end of the hose and has a cylindrical portion provided with threads 13 for connecting the sleeve to a companion member of a motor vehicle or the like. The lower end 14 of the sleeve 12 is flared radially outward and is preferably provided with a hexagonal periphery to facilitate threading the sleeve into another member.

The sleeve is provided with an internal bore of a slightly smaller diameter than the hose to cause a slight compression of the hose when it is inserted in the sleeve, so that upon the subsequent expansion of the hose by a thimble or nipple 15 which is inserted therein, the hose will not be expanded beyond its mean diameter.

The interior of the sleeve 12 is provided with a portion 16 of a smaller diameter than the remaining portion of the sleeve, thereby providing an enlarged portion 16' adjacent the end of the hose which is compressed to a lesser degree than the intermediate portion, resulting in a strong interlocking connection between the hose and the sleeve. The end of the sleeve is provided with an axially extending flange 17 formed by enlarging the bore of the sleeve adjacent the end.

The thimble 15 which is adapted to be inserted in the hose and expanded therein and interlocked with the sleeve, comprises a cylindrical portion 18 having a disk 19 integral with the end thereof. The periphery of the disk-shaped portion 19 is slightly beveled so that when seated upon the shoulder within the sleeve flange 17 of the sleeve may be crimped inwardly to form an interlock between the sleeve and the thimble.

In assembling the coupling upon the end of the hose, the hose is first manually inserted within the sleeve and the end of the thimble is placed within the bore of the hose. The sleeve and hose are then placed upon an anvil 21 having a slot 22 therein permitting the hose to be laterally inserted within the slot in such a position that the head of the sleeve will rest upon the anvil.

The apparatus for assembling the coupling comprises a press head 23 carrying a plunger 24. The lower end 25 of the plunger is cone-shaped and serves to expand the cylindrical portion 18 of the thimble to compress the hose against the inner wall of the sleeve.

Rearwardly of the cone-shaped portion the head of the plunger is provided with a short cylindrical portion 26. The plunger 24 has a tapering portion 27 which terminates in a cylindrical portion 28 of slightly greater diameter than the head of the plunger for a purpose to be described later.

Intermediate the cylindrical portions 26 and 28 the plunger is of a reduced diameter to avoid unnecessary friction in the expansion of the thimble. Surrounding the plunger 24 is a reciprocable block or piston 31 which is urged downwardly by a spring 32 resting at its upper end against the head 23 of the press. Surrounding the block 31 is a cylinder or sleeve 33. The block 31 is provided with a shoulder 34 and the sleeve 33 is provided with a cooperating shoulder 35 for limiting the relative movement between the block and the sleeve.

The lower end of the sleeve is provided with a beveled inner periphery 20 for crimping the flange 17 against the beveled edge of the thimble when the head 23 of the press strikes the upper end of the sleeve.

When the hose and sleeve have been placed upon the anvil, as described above, and the thimble 15 has been started into the hose, the press head is moved downwardly, forcing the thimble into the hose. Upon a further downward movement of the press head, spring 32, acting through block 31, will cause the disk 19 of the thimble to be seated within the flange 17 of the sleeve.

A still further downward movement of the press head will cause the plunger head 25 to enter the bore of the thimble and expand the thimble to compress the hose against the inner wall of the sleeve. Just as the head of the plunger has passed through the entire thimble and expanded it, the enlarged portion 28 of the plunger enters the upper end of the thimble to enlarge this portion, as indicated at 18' (Fig. 2), so as to permit the ready removal of the plunger head.

When the plunger head has passed through the thimble and the enlarged portion 28 of the plunger is within the end of the thimble, the press head 23 strikes the upper end of sleeve 33 and causes the beveled inner periphery of the lower end of the sleeve to crimp the flange 17 inwardly to securely interlock the sleeve with the thimble, as clearly shown, thus completing the assembling operation. It will be noted that at this time spring 32 is considerably compressed so that upon the raising of the press head 23 and the withdrawal of the plunger from the coupling, the spring will exert sufficient pressure upon block 31 to retain the coupling upon the anvil and allow the plunger to be withdrawn from the completed coupling.

This application is a division of my copending application, Serial No. 360,360, filed May 4, 1929, now Patent 1,886,807 of November 8, 1932.

While I have described only one embodiment of my invention, it is to be understood that my invention is capable of assuming various forms, and that the scope of my invention is to be limited solely by the following claim.

I claim:

In a completely assembled coupling of the class described, in combination, a hose, a sleeve surrounding one end of said hose, said sleeve having adjacent portions of different internal diameters, forming a shoulder portion, a thimble interlocked with said sleeve, extending into the bore of said hose to a point beyond said shoulder, and expanded to two diameters, the portion of larger diameter lying adjacent the end of said hose and extending into the hose to a point short of said shoulder portion of the sleeve, the hose being subjected to a maximum compressive force over a portion thereof disposed between the ends of said thimble.

JOSEPH R. HEIDLOFF.